Nov. 22, 1955 — A. H. SCHMAL — 2,724,252

CLUTCH VIBRATION DAMPENER

Filed May 8, 1952

INVENTOR.
ALOIS H. SCHMAL
BY
Campbell, Brumbaugh, Free & Graves
HIS ATTORNEYS.

United States Patent Office 2,724,252
Patented Nov. 22, 1955

2,724,252

CLUTCH VIBRATION DAMPENER

Alois H. Schmal, Westfield, N. J., assignor to Mack Manufacturing Corporation, New York, N. Y., a corporation of Delaware Application May 8, 1952, Serial No. 286,786

3 Claims. (Cl. 64—27)

This invention relates to a vibration dampener and it relates more particularly to a device for dampening vibrations between two rotatable elements, such as for example, between a drive shaft and a clutch plate, a supercharger, a pump or the like.

Vibration dampeners generally of the type to which the present invention relates have been produced heretofore. They usually include a pair of interfitting members, one of which has a plurality of cam surfaces which cooperate with a series of leaf springs so that relative rotation of the elements is permitted but is dampened by the action of the springs. Some of the prior types of vibration dampeners have relied upon the cooperation between the cam surfaces and the springs to afford the sole driving connection between the two elements of the dampeners. Others have provided, in addition to the cams and the springs, abutting surfaces on the two elements which provide a positive driving connection but also permit limited relative movement between the two elements. The springs serve to dampen vibrations and shock and thereby promote a smoother transmission of power between the two elements of the vibration dampener.

The types of vibration dampeners described above have certain disadvantages. The vibration dampener which relies solely upon engagement between the cam surface on one member and the springs carried by the other member is rendered ineffective to transmit power if the springs break.

The type which has abutment surfaces for a positive drive has been constructed heretofore so that the cam surfaces deflect the spring into contact with the walls of the spring-supporting member. As a result, these springs are subjected to high compression forces and their life is shortened by the stresses set up therein and by scuffing and wear on the cam surfaces and the springs.

Vibration dampeners of the type embodying the present invention are constructed and arranged to have the desirable features of the prior vibration dampeners and arranged so that their operating life is greatly prolonged over the prior devices by a novel co-action between the cam surfaces and the cushioning springs.

More particularly, the new vibration dampener may include a housing having a recess for receiving a generally polygonal and preferably generally triangular hub member. The recess is also of generally polygonal cross-section so that only limited relative rotation can take place between these elements. The sides of the hub member preferably have extended portions which are generally flat and have convexly curved camming portions at their ends, the camming portions being spaced inwardly from the corners of the hub. The flat surfaces of the hub member bear against leaf spring members which are supported at their ends on spring supports in the sides of the housing so that the springs can flex and resist relative rotation by reaction on the cam surfaces of the hub member.

A particular feature of the new vibration dampener is that space is provided behind the springs to allow them to be deflected by the cam members without forcing the springs against the inner walls of the housing. In this way, the springs are subjected to bending stresses but never to compression stresses and, as a consequence, scuffing and breaking of the springs is reduced to a minimum. Overstressing of the springs is also avoided because the hub member engages cooperating abutments in the housing before the springs are deflected into contact with the housing. Due to the above-described relationship of parts, a postitive driving connection is provided between the hub and the housing regardless of whether the springs are present or absent and under no circumstances can the springs be compressed between opposing rigid surfaces in such a way as to break or damage them.

It is preferred to have three or more surfaces on the hub and an equal number of springs because such an arrangement provides for more accurate centering of the hub with respect to the housing than is possible with a two sided or generally oval hub member.

For a better understanding of the present invention, reference may be had to the accompanying drawing in which.

Figure 1:
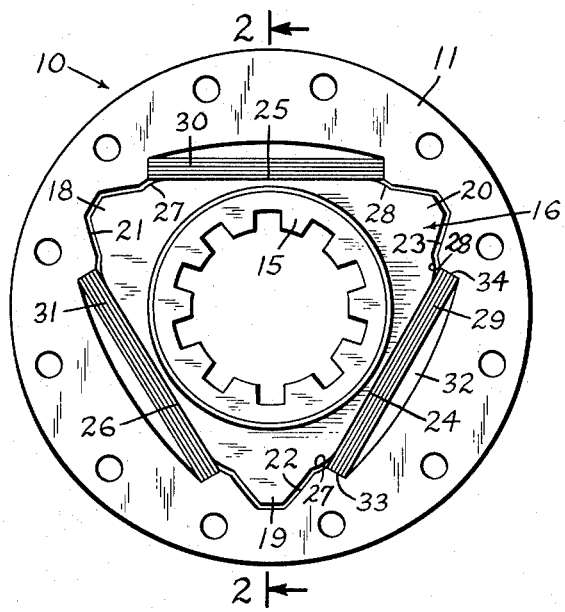
Fig. 1 is a plan view of a typical clutch vibration dampener with the cover plate of the device removed.
Figure 2:
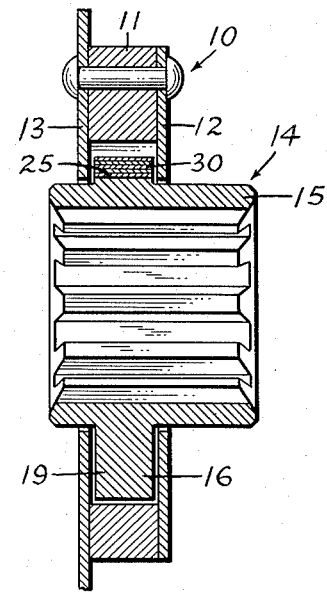
Fig. 2 is a view in section taken on line 2—2 of Fig. 1 and showing a cover plate, such as a portion of a clutch disc secured to the housing.

As shown in Figs. 1 and 2, a typical form of vibration dampener for use in a clutch may include a housing 10 which consists of a ring-like member 11 having secured to its opposite faces an annular cover plate 12 and another plate 13, such as for example, a plate of a disc-type clutch. If desired, one or the other of the plates may be replaced by a suitable coupling to enable a shaft to be connected to the housing 10, or the ring-like member 11 may be provided with gear teeth to serve as a drive or driven member.

Mounted within the housing 10 is a hub member 14 which consists of an internally splined sleeve 15 of generally cylindrical periphery adapted to receive a splined shaft (not shown) and carrying a cam and driving flange 16 of such width that it is disposed loosely between the plates 12 and 13 of the housing. As shown in Fig. 1, the ring-like member 11 is provided with a centrally located recess 17 in which the flange 16 of the hub 14 is received. As illustrated, the flange 16 is generally triangular in cross section and has corners 18, 19 and 20 which engage loosely in complemental grooves 21, 22 and 23 in the inner wall of the ring-like member 11. Sufficient space is left between the sides of the grooves 21 to 23 and the corners 18 to 20 to permit limited relative rotation of the housing 10 and the hub member 14.

The flange 16 is provided with flat faces 24, 25 and 26 which are shorter than the distances between the corners or projections 18 to 20. The opposite ends of each of the sides 24 to 26 are provided with convexly curved cam surfaces 27 and 28 which merge into the corner portions of the flange 16.

The flat faces 24 to 26 of the hub member, as illustrated in Fig. 1, bear against the inwardly facing sides of sets of leaf springs 29, 30 and 31. Each spring, for example the spring 29, is mounted in a recess 32 in the inner wall of the ring 11 and has its opposite ends seated against the shoulders 33 and 34 at the ends of the recess 32. The spring 29 is unsupported between its ends so that it can be flexed by engagement by one or the other sets of cam surfaces 27 and 28 depending upon the direction of relative rotation of the hub 14 and the housing 10.

The mid-portion of each recess 32 is made sufficiently deep that when the hub 14 has been rotated relative to the housing 10 to bring the corner projections 18 to 20 against a side of the grooves 21 to 23, the spring will not engage the bottom of the recess 32. In this way, the springs of the vibration dampener cannot be squeezed between the cam surfaces on the hub 14 and a wall of the housing and, as a consequence, the springs are not subjected to crushing force.

Figure 3:
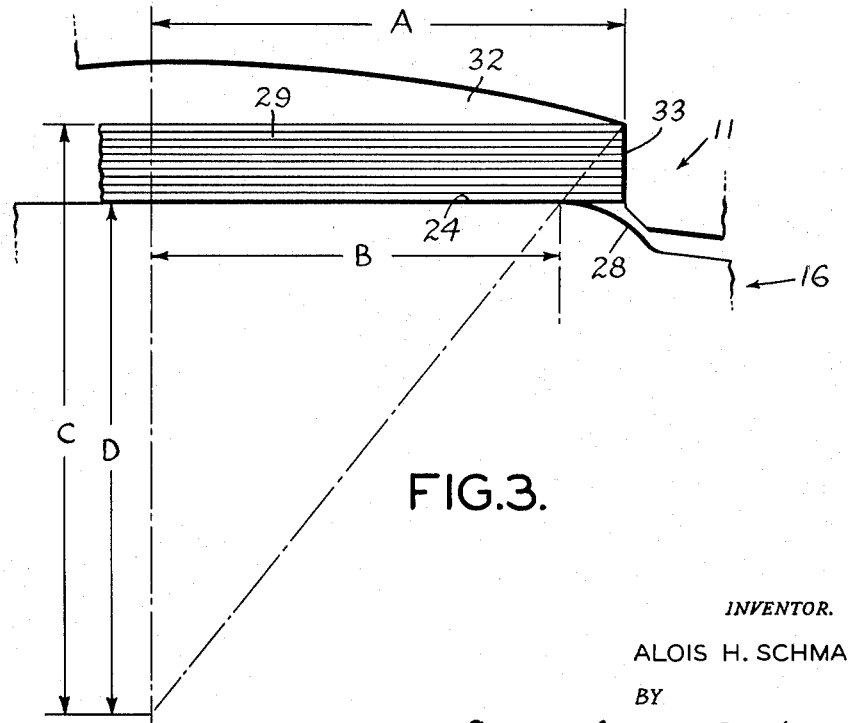
Fig. 3 is an enlarged schematic showing of a portion of the hub and housing of the vibration dampener showing the dimensional relations between elements of the vibration dampener.

The provision of rounded cam surfaces 27 and 28 also reduces wear of and damage to the springs. Such wear can be reduced to a minimum by relating the positions of the cam surfaces to the springs in such a way as to maintain substantially a rolling engagement between them rather than a sliding and scuffing action. The preferred relation between the cams and the springs is best shown in Fig. 3, in which A is one-half the length of the spring, B is the distance of a cam lobe from the center of its corresponding flat surface 24, for example, C is the distance from the center of the hub to the plane of the spring seats, and D is the perpendicular distance from the center of the hub to the flat surface 24. In order to obtain an effective rolling contact between the cams and the springs the relation between A, B, C and D should be $$\frac{A}{B}=\frac{C}{D}$$

In a vibration dampener of the type disclosed, the driving forces are carried by the corners 18 to 20 of the hub and the sides of the grooves 21 to 23 and not by the springs, so that even if the springs should be broken, a positive driving action is assured. The springs serve to absorb vibration during the limited relative rotation between the housing 10 and the hub 14 and the springs, therefore, are never subjected to the high compressive force which would be present if the springs were used as a positive driving means and were compressed between rigid surfaces to accomplish such a driving action. Moreover, the springs are deflected in only one direction and can flex or bend throughout their full extent so that they are not twisted or subjected to oppositely directed stresses which would shorten their operating life.

It will be understood that vibration dampeners of the type described above are susceptible to considerable modification. For example, the hub 14 and the ring 11 may be modified to have more than three opposing sides with an equal number of sets of springs for absorbing vibration. Moreover, the faces 24 to 26 of the hub do not have to be flat throughout their entire extent. They may be concavely curved or relieved between the cam surfaces. Moreover, if desired, the ring 11 may be provided with inwardly extending tongues which engage loosely in grooves in the hub member to establish a positive connection, with capacity for limited relative rotation, between them. Moreover, the vibration dampener can be modified substantially in its size and proportions. Also, the springs may be made stronger or weaker depending upon the driving forces to which the vibration dampener is subjected. For example, a single leaf spring rather than a multileaf spring may be used in opposition to each of the sides of the hub member flange. Therefore, the form of the invention described herein should be considered as illustrative and not as limiting the scope of the following claims.

I claim:

1. A vibration dampener comprising a hub member of generally polygonal cross section, said hub member having sides of substantially equal length and corners at the junctions of said sides, each side comprising a substantially flat portion having inwardly curved, convex cam portions at its opposite ends spaced inwardly of said corners, a housing having a recess receiving said hub member for relative movement, said recess being generally complemental in cross section to said hub member and including notches receiving the corners of said hub member loosely and limiting the relative rotation of said hub member and housing, said housing also having an elongated recess in each side between said notches and seats at opposite ends of said elongated recess and an outer wall at the back of each elongated recess, said seats being spaced apart farther than distance between the cam portions on each side of said hub member, a leaf spring member in each elongated recess and having its opposite ends supported by said seats and its midportion out of contact with said outer wall, the flat portion of each side of said hub member normally engaging a spring member and said cam portions being engageable with said springs upon relative rotation of said hub portion and housing, the depth of each elongated recess being sufficient to enable the spring members to be flexed by said cam portions, while remaining out of engagement with the outer wall of the housing at the back of each elongated recess, throughout the entire extent of relative movement of said hub member and housing.

2. A vibration dampener comprising a hub member of generally polygonal cross section, said hub member having sides of substantially equal length and corners at the junctions of said sides, each side comprising a substantially flat portion having inwardly curved, convex cam portions at its opposite ends spaced inwardly from said corners, a hollow housing having angularly spaced grooves in its inner periphery to receive said corners for limiting the relative angular movement of said hub member and said housing, said housing having elongated recesses in its inner periphery between said grooves corresponding to and of about the same length as, and opposing said flat portions of said hub member, leaf spring members extending lengthwise in said elongated recesses and normally abutting said flat portions, said elongated recesses having bottoms spaced from said spring members to enable them to be flexed by said cam portions while remaining free from engagement with the bottoms of said recesses in all positions of relative angular movement of said hub member and said housing.

3. A vibration dampener comprising a housing to be connected to a rotary member and having an internal recess, a hub member to be secured to another rotary member, said hub member being mounted in said recess coaxial with said housing, said hub member and said recess being of similar generally polygonal cross section and fitting loosely for relative rotation, loosely interfitting projections and recesses on said hub member and housing to limit said relative rotation and effect a positive driving connection between said hub member and housing at both limits of relative rotation thereof, pairs of convexly curved cam portions spaced inwardly from the ends of each side of said hub member, substantially flat leaf spring members supported at their opposite ends in said housing and opposing said sides, said leaf spring members engaging said cam portions and being deflectable thereby upon relative rotation of said hub member and housing while remaining free from engagement with said housing, except at their ends, between the limits of said relative rotation.

References Cited in the file of this patent

UNITED STATES PATENTS

| | | |
|---|---|---|
| 1,704,503 | Gamble | Mar. 5, 1929 |
| 1,946,144 | Hughes | Feb. 6, 1934 |
| 1,962,993 | Leece | June 12, 1934 |
| 2,158,244 | Mistretta et al. | May 16, 1939 |